United States Patent
Dhalla et al.

(10) Patent No.: US 10,284,358 B1
(45) Date of Patent: May 7, 2019

(54) CLOCK AND FRAME SYNCHRONIZATION CARRIED AS A SINGLE COMPOSITE SIGNAL ALLOWS THE USE OF A SINGLE TRANSMISSION LINE WITH A NARROWER BANDWIDTH

(71) Applicant: Northrop Grumman Systems Corporation, Falls Church, VA (US)

(72) Inventors: Cyrus Dhalla, Redondo Beach, CA (US); Jonathan Krauss, Hermosa Beach, CA (US); Scott M. Takahashi, Torrance, CA (US); Gerald R. Fischer, Luray, VA (US); Douglas S. Cockfield, Newport, OR (US); Akop Gazdzhyan, Glendale, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 21 days.

(21) Appl. No.: 15/468,198

(22) Filed: Mar. 24, 2017

(51) Int. Cl.
*H04L 7/00* (2006.01)
*H04L 7/08* (2006.01)

(52) U.S. Cl.
CPC .............. *H04L 7/0008* (2013.01); *H04L 7/08* (2013.01)

(58) Field of Classification Search
CPC . H04L 7/0008; H04L 7/02; H04L 7/08; G06F 1/04; G06F 1/10; G06F 1/12
See application file for complete search history.

(56) References Cited

U.S. PATENT DOCUMENTS

| | | | |
|---|---|---|---|
| 6,396,888 B1 * | 5/2002 | Notani | H04L 7/0008 370/514 |
| 2015/0171850 A1 * | 6/2015 | Zwiebel | H04L 7/0008 327/263 |

* cited by examiner

*Primary Examiner* — Betsy Deppe
(74) *Attorney, Agent, or Firm* — McCracken & Gillen LLC

(57) ABSTRACT

An embodiment generates a composite high speed clock with embedded frame synchronization using simple digital encoding of a high speed reference clock. The high speed reference clock and self-aligned frame synchronization signal are recovered by standard logic gate circuitry. The encoding and decoding circuits are comprised of basic digital logic gates with low propagation delay skew and timing jitter. The encoded clock is easier to transmit from source unit to destination unit over common transmission media (i.e., digital transceivers, amplifiers, splitters, connectors and coaxial cable) because only a single interface is required and because the encoding scheme reduces the composite clock to a minimal transmission bandwidth with constrained waveform harmonic content, relative to a low frequency frame sync with fast rise time that requires a broadband transmission media.

16 Claims, 9 Drawing Sheets

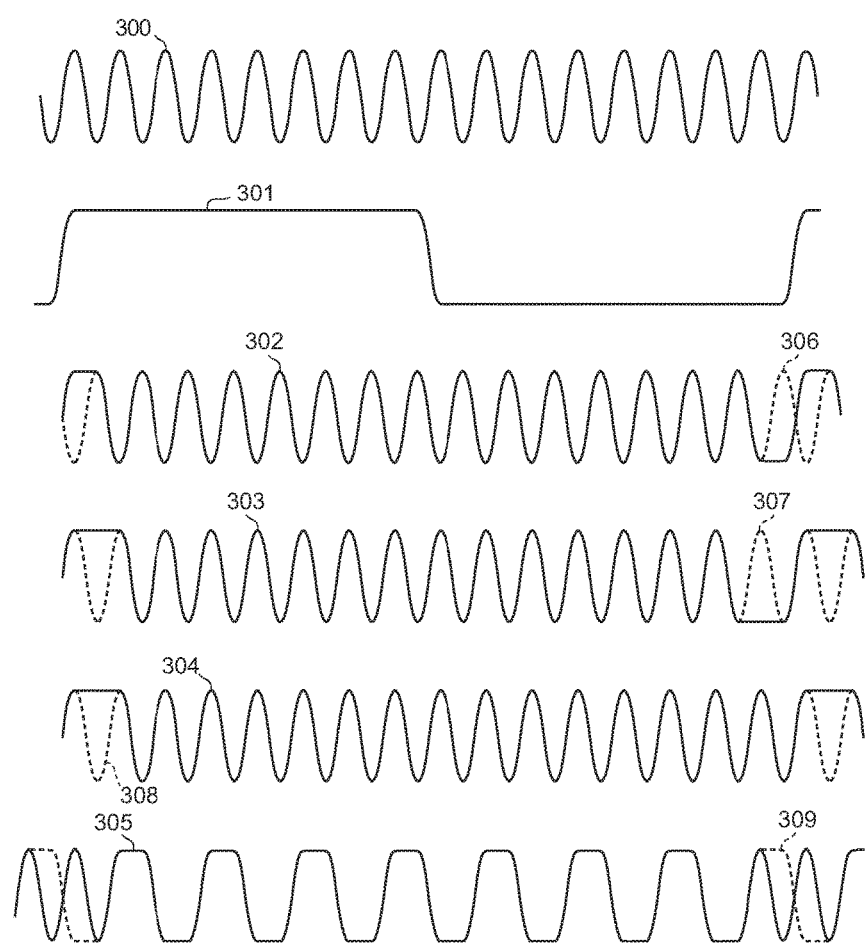

CLOCK AND FRAME SYNCHRONIZATION CARRIED AS A SINGLE COMPOSITE SIGNAL ALLOWS THE USE OF A SINGLE TRANSMISSION LINE WITH A NARROWER BANDWIDTH

BACKGROUND

This invention relates generally to a digital system in which a high speed clock signal and a frame synchronization signal are needed at one or more locations/components remote from the origination location of the signals.

A high speed data or communication system requires time alignment to a master clock. Systems that employ multiple high speed digital processors often require synchronization with each other in order to properly process incoming data. The distribution of the clocks to the various points of use requires attention to the time alignment of high speed master clocks relative to lower speed synchronization clocks in order to maintain setup and hold time margins for transferring data. The time alignment is impaired by variations in time delay on the separate paths taken by one clock versus another. High bandwidth circuits and transmission media can help to improve alignment accuracy but come with disadvantages such as increased size, weight, power, and cost.

Generation and distribution of a sinusoidal multi GHz reference clock, with equivalent rise time of tens of picoseconds, to all elements in a processor with precise phase alignment can be achieved using passive power splitters and coaxial cables with controlled lengths. The bandwidth of a sinusoidal reference clock distribution system can be very low and therefore clock jitter due to integrated phase noise and deterministic jitter is limited.

However, the distribution of a low frequency frame sync signal to all elements in a multi-element system with its critical timing edges precisely aligned to the high speed master reference clock presents significant challenges, e.g. requiring sufficient setup and hold times to permit re-clocking by the reference clock to remove any phase jitter and timing error. For example, a system timing budget with a 10 GHz reference clock with a clock period T of 100 ps would typically (for integrated circuits using 25 nm CMOS or InP) require 10 ps each for setup and hold times (10%+10%) in order to reclock the frame synchronization signal. Subtracting 30 ps for rise and fall times (30%), and an addition 10 ps for jitter (10%), from the 100 ps clock period leaves only 40 ps (40%) for total timing skew between the 10 GHz reference clock and the synchronization signal at the destination where reclocking occurs. In order to achieve error-free transmission of system data this timing uncertainty needs to be in practice sufficiently less than 40% (e.g., 20% or 20 ps.). To avoid signal distortion that would be perceived as a timing error the distribution system for the frame synchronization signal, e.g. at 10 MHz, must be sufficiently broadband to accommodate all of the harmonics arising from the digital signal's rise and fall times; in this case 30 ps, which is roughly equivalent to the 10 GHz reference clock. Practical coaxial and twisted shielded pair cable media, connectors, and printed circuit board traces result in substantial high frequency attenuation at the 10 GHz equivalent band edge, relative to 10 MHz, and therefore introduce signal distortion and group delay errors in the frame sync signal. Employing an equalization circuit may partially offset the synchronization signal distortion due to high frequency attenuation provided overall attenuation is not excessive. However the ability to distribute a synchronization signal that is group delay-matched to the reference frequency, in this example 20 ps, is limited to short distances and is impractical without costly low loss interconnecting media, matching equalization, and, of course, careful matching of the nominal path lengths and their associated delays. Furthermore, clock distribution systems often employ AC coupling to eliminate DC offset problems and it is difficult to obtain broadband AC coupling and DC restoration (Bias-T) components that support a large ratio of upper frequency limit to the AC coupling frequency (which must be on the order of 50 times lower in frequency than the synchronization frequency in order to control "droop"). Thus, there exists a need for an improvement in the distribution of frame sync signals with a high speed master clock signal where the frame sync signal is relatively low in frequency relative to the frequency of the master clock.

SUMMARY OF THE INVENTION

It is an object of the invention to address this need.

Embodiments of the invention embed the frame sync timing signal with the master reference clock signal and thus eliminate the need for a separate frame sync signal distribution system that must be precisely time-aligned to the reference clock. The integrated master reference clock signal and frame sync signal may be re-constructed into separate respective signals at the destination using standard digital logic elements. These recovered signals provide time synchronized signals from which any additional clock signals can be derived at a destination remote from the origination of the master clock and frame sync clock, e.g. a clock for a remote digital processor system. The edge timing of all re-constructed clock signals and frame sync signals are derived from the re-constructed master reference clock with its low timing jitter. The bandwidth needed to distribute the integrated master clock signal and frame sync signal is only a small fraction of the bandwidth required to distribute a reference clock and frame sync clock as two separate signals assuming precise timing of the frame sync clock edge to the master clock edge is required. Clock distribution systems which employ AC coupling will require approximately two decades less bandwidth. In systems where alignment in the timing of signals is very important, e.g. individual signals sent to each element or group of elements, embodiments of the present invention can provide the needed timing accuracy, e.g. tens of picoseconds or less of timing uncertainty are practical.

BRIEF DESCRIPTION OF THE DRAWINGS

FIG. 10 is a timing diagram of alternative clock encoding embodiments to embed frame synchronization onto a reference clock.

DETAILED DESCRIPTION OF EMBODIMENTS OF THE INVENTION

The following discussion of the embodiments of the present invention directed to a system and method for providing a composite clock with embedded frame synchronization and recovery from the composite clock of the master clock signal and frame sync signal are merely exemplary in nature, and are not intended to limit the invention or its applications or uses. The embodiments provide improved timing alignment accuracy by combining a high speed master clock signal and a relatively low speed frame synchronization clock signal into a single composite signal that travels on a single path thereby eliminating path to path alignment requirements associated with the transmission of each signal on a separate path.

Figure 1:
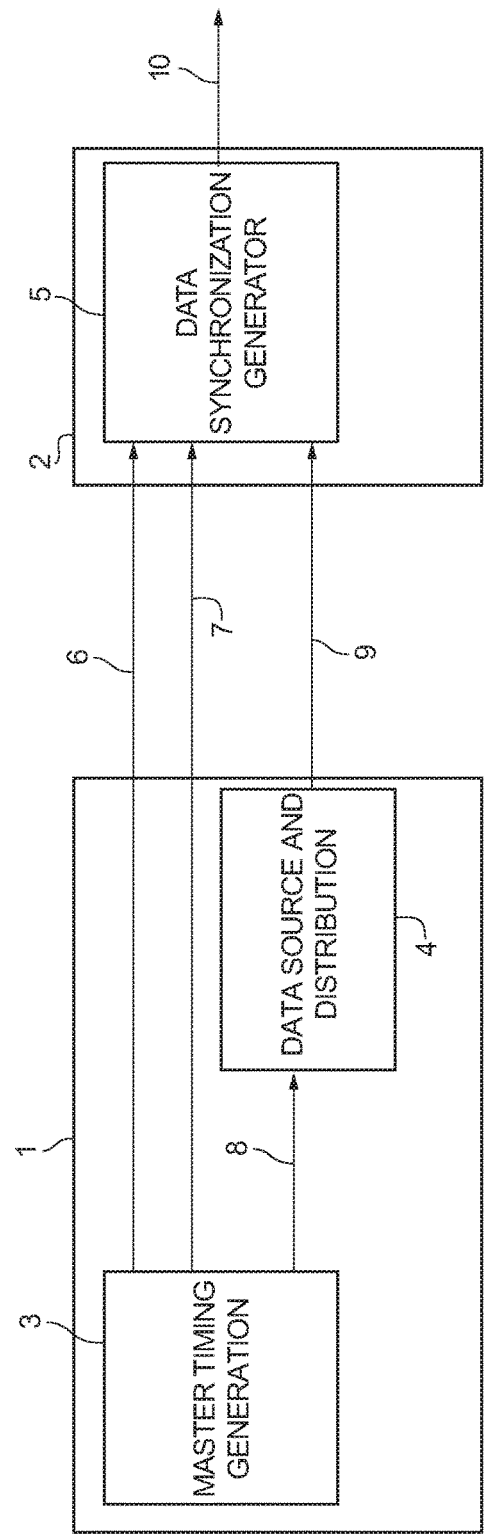
FIG. 1 is a block diagram of a known clock distribution scheme in which reference clock and frame sync clock signals are separately transmitted to a remote component.

FIG. 1 is a schematic block diagram of a known prior art timing synchronization scheme in which a clock generation source unit 1 sends clock signals and data to a destination digital processing unit 2. Within the source unit 1 a master timing generator 3 generates a high speed reference clock 6, a frame synchronization signal 7 and a digital system clock 8. The timing skew between these clocks can be reduced to a value on the order of one flip-flop delay using the technique of "re-clocking" or "registering" the lower speed clocks using the high speed clock. Using state of the art [e.g., 25 nm CMOS or InP] high speed digital counters and registers the timing skew between these signals is on the order of 20 ps, or 20% of a 100 ps clock period T for an exemplary 10 GHz high speed reference clock. A data source and distribution function 4 in clock generation source unit 1 generates a clock and data interface 9 sent as a separate interface/signal path. Within the destination digital processing unit 2, a data synchronization function 5 within the processor uses the frame sync signal 7 to align the source high speed and system clocks to the data, and generates a high speed output data signal 10.

This timing synchronization method requires that the high speed reference clock 6 and frame synchronization signal 7 be time-aligned to each other (e.g., 20% as mentioned above) and for each signal to have a comparable (substantially equal) rise time (30 ps rise and fall times in a 10 GHz reference clock). The transmission media (not shown), including transmitting buffer, connectors, cables and receiving buffer associated with the transmission of both signals must be broadband in order to maintain low distortion and matched group delay for both waveforms. At high RF frequencies the transmission media has substantial attenuation, requiring amplification and cable equalization. This introduces additional constraints since each amplification and/or equalization device in the two paths may introduce unequal timing factors.

Figure 2:
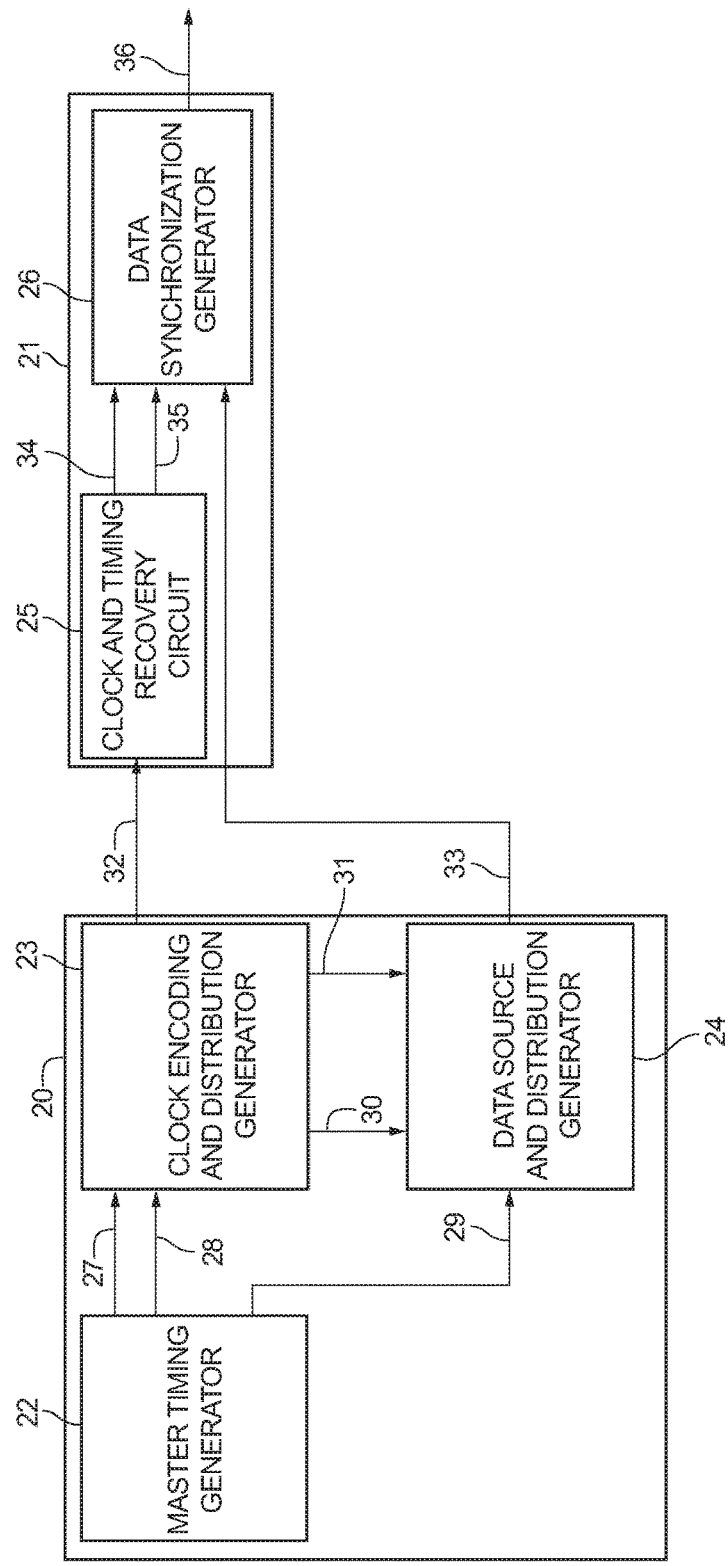
FIG. 2 is a block diagram of an exemplary clock distribution scheme in accordance with an embodiment of the present invention using a single transmission line to transmit an embedded reference clock and frame sync clock signal to a separate remote system component.

FIG. 2 is a block diagram of an exemplary embodiment 20 of the present invention in which a clock encoding and distribution generator 23 generates a reference clock 30 and frame synchronization signal 31, and outputs a single composite clock 32 with the frame synchronization embedded therein. The need to provide two transmission paths 6, 7 with matched timing interfaces with matched group delay as in FIG. 1 is eliminated. A master timing generator 22 generates a high speed reference clock 27, a frame synchronization signal 28 and a digital system clock 29. A data source and distribution generator 24 generates a clock and data output 33 sent on a separate path from the path carrying the composite clock 32. Within the destination digital processing unit 21, a clock and timing recovery circuit 25 reconstructs/derives the high speed reference clock 34 and frame sync signal 35, preferably using digital logic elements with low timing jitter. A data synchronization generator 26 within the processing unit 21 uses the re-constructed/derived high speed reference clock 34 and sync signal 35 to generate internal system clocks, process the clock and data output 33, and generate a high speed data output signal 36 containing the digital data carried by clock and data output 33.

Figure 3:
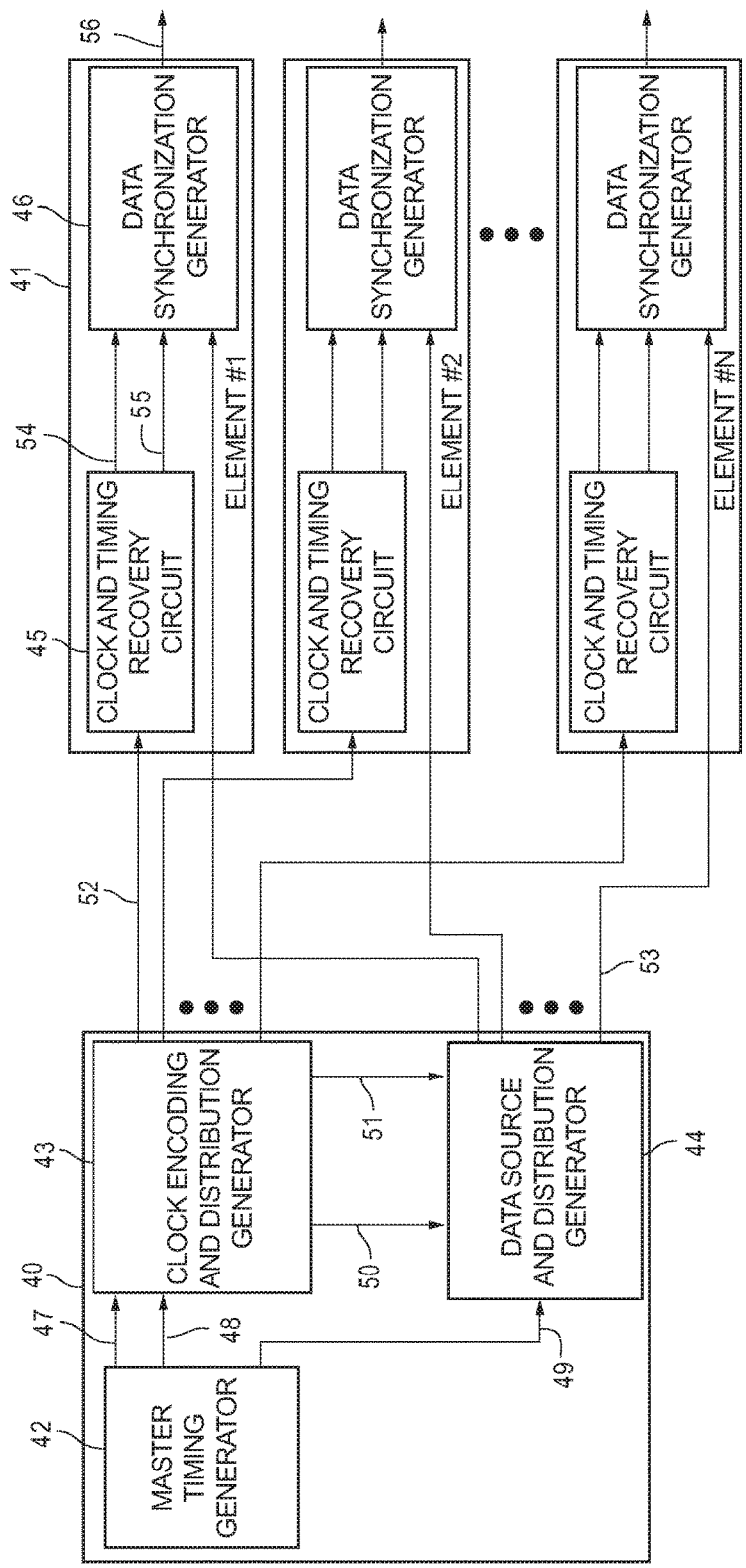
FIG. 3 is a block diagram of an exemplary embodiment of an integrated clock and frame sync signal distribution scheme to multiple remote elements.

FIG. 3 is a schematic block diagram of an embodiment of the timing synchronization invention in which a clock generation source unit 40, sends clocks and data to N destination digital processing elements 41. FIG. 3 is similar to FIG. 2 except that multiple separate source data streams are being transmitted to remote processing units. A single master timing generator 42 generates a high speed reference clock 47, a frame synchronization signal 48 and a digital system clock 49. A clock encoding and distribution generator 43 generates a reference clock 50 and frame synchronization signal 51, and outputs N composite clocks 52 with the frame synchronization embedded therein. A data source and distribution generator 44 generates N clock and data outputs 53 sent as N separate interfaces (separate from the respective composite clock interface) in similar fashion to FIG. 2. Within each of the N destination digital processing elements 41, a clock and timing recovery circuit 45 re-constructs/derives the high speed reference clock 54 and frame sync signal 55, preferably using standard digital logic with low timing jitter. A data synchronization generator 46 within the processor uses the re-constructed/derived high speed reference clock 54 and sync signal 55 to generate internal system clocks, process the respective clock and data outputs 53, and generate a high speed output signal 56 of the received. Each of the N high speed output signals 56 are precisely time-aligned to each other since the respective high speed reference clocks 54 and frame sync signals 55 are in precise time alignment. The relative timing between edges of the local reference digital clock signal 54 and the local frame synchronization signal 55 is substantially the same as relative timing between edges of the original reference digital clock signal and the frame synchronization signal, because the same technique of "re-clocking" or "registering" the lower speed clock using the higher speed clock in a flip-flop is effectively present.

Figure 4:
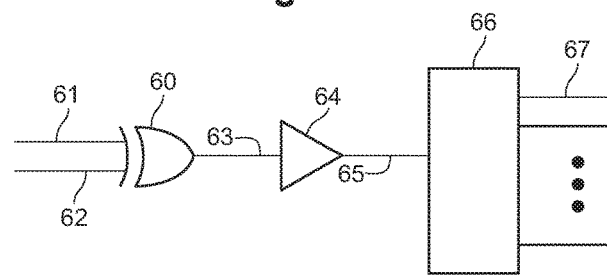
FIG. 4 is an embodiment of an encoding circuit that can generate a composite signal containing high speed reference clock and a frame synchronization signals.

FIG. 4 is a schematic diagram of an embodiment of a clock encoding and distribution generator, i.e. a composite clock encoding circuit. It includes an exclusive-OR digital gate 60 which combines a high speed reference clock 61 (27 or 47) and frame synchronization signal 62 (28 or 48) to generate a high speed composite reference clock 63 (32 or 52) using exemplary binary phase shift keying (BPSK) where the high speed reference clock acts as a "carrier" modulated by the synchronization signal as "baseband data". It is noted that in this case the equivalent "baseband data" is a periodic signal rather than random data and therefore the frequency spectrum will be a series of discrete frequency components. The original clock phase at input 61 is inverted on output 63 when the synchronization signal 62 is in a high state and non-inverted when the synchronization signal 62 is in a low state. This generation technique is preferably used when the high speed reference clock signal frequency is an even integer multiple of 4 or greater times the synchronization signal frequency. A narrowband RF amplifier 64 outputs an amplified composite clock signal 65 feeding a passive divider 66 which generates multiple copies 67 (32, 52) with matching phase (time alignment).

Figure 5:
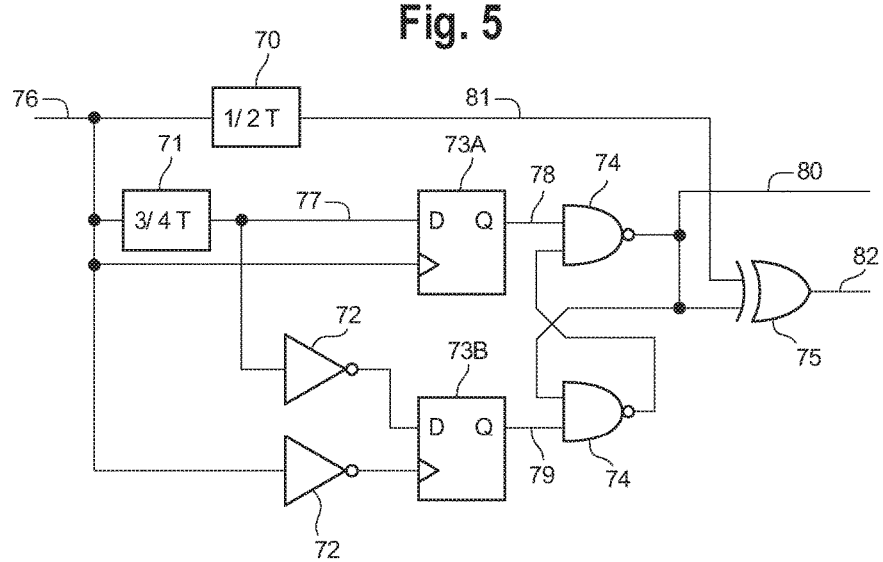
FIG. 5 is an embodiment of an exemplary decoding circuit in accordance with an embodiment of the present invention that reconstructs/derives a high speed reference clock signal and a frame synchronization signal from the composite signal.

FIG. 5 is a schematic diagram of an embodiment of a clock and timing recovery circuit (25 in FIG. 2, 45 in FIG. 3) designed to recover the clock and frame sync information from the composite signal such as generated with the encoding circuit in FIG. 4. This circuit is preferably made with standard digital logic gates: delay lines 70 and 71, inverters 72, D-type Flip Flops (DFF) 73A, 73B, inverting AND gates 74, and an exclusive-OR gate 75. The composite high speed clock 76 is delayed by three quarters of a clock period at signal 77 and by one half of a clock period at signal 81. In this embodiment the high speed reference clock period T is predetermined (known) and the delay lines 70 and 71 may be manually hard-coded or set by buffers with voltage-controlled delay. The composite high speed clock 76 is used to re-clock its delayed waveform 77 by DFF 73A to generate a first recovered sync pulse 78. An inverted copy of the composite high speed clock is likewise used to re-clock an inverted copy of its delayed waveform by a DFF 73B to generate a second recovered sync pulse 79. The composite high speed clock functions as both a sampling clock and a data signal at twice the original clock frequency using both rising and falling edges as in a double data rate (DDR) system. Sync pulses 78 and 79 generate the recovered synchronization signal 80 as an output of two NAND gates 74 configured as a reset-set (RS) Flip Flop. The recovered synchronization signal 80 and delayed composite clock 81 are combined in exclusive-OR gate 75 to generate the recovered high speed reference clock 82. The clock 82 and sync signal 80 have the same phase relationship as the original high speed reference clock and synchronization signal, respectively, before the latter were encoded into the composite high speed clock 76. The relative timing between edges of the local reference digital clock signal and the local frame synchronization signal being substantially the same, i.e. within the delay associated with a signal passing through one flip flop or alternatively within 20% of a cycle interval, as the relative timing between edges of the reference digital clock signal and the frame synchronization signal. The recovered local reference digital clock signal and local frame synchronization signal are automatically self aligned to each other by the recovery without requiring external timing alignment, where self aligned means being aligned within the same tolerance as "substantially the same" defined in this paragraph.

Figure 6:
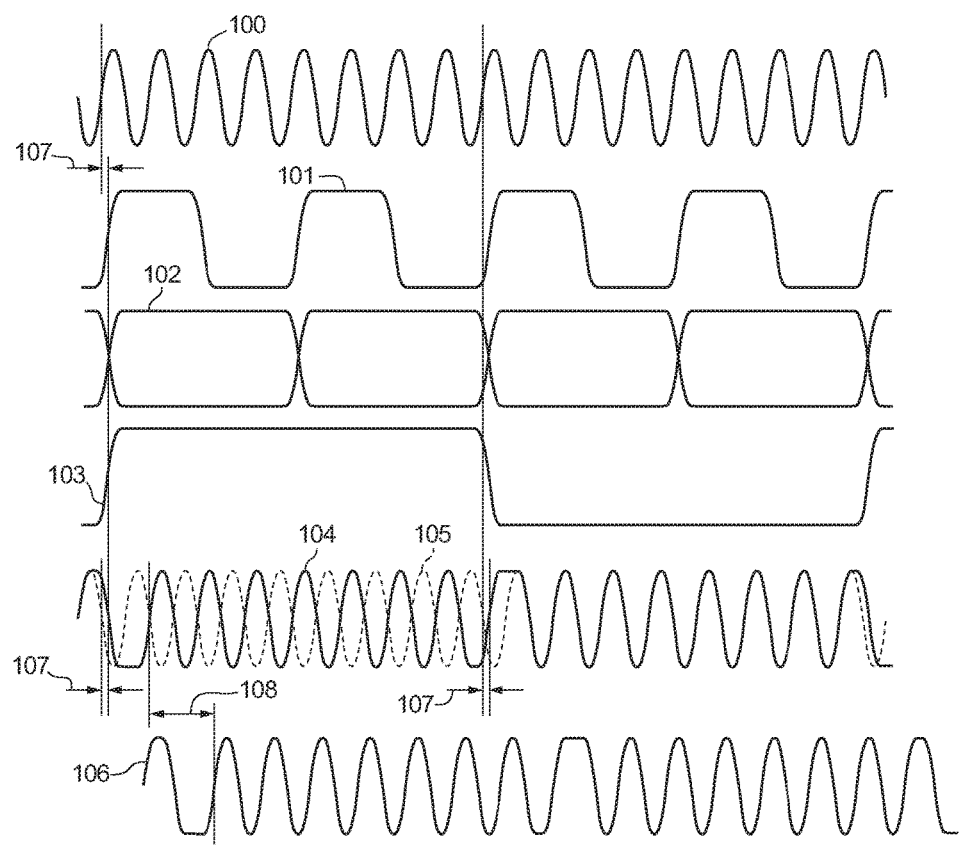
FIG. 6 is a timing diagram of waveforms associated with the generation of the composite clock signal of FIG. 4.

FIG. 6 is an illustration of exemplary timing waveforms generated by the embodiment of FIG. 3 using the binary phase shift keying (BPSK) encoding design of the embodiment of FIG. 4. The single master timing generator 42 of FIG. 3 generates a master high speed reference clock 100, a master system clock 101 and master frame synchronization signal 103. In this example, chosen to make an explanation of the timing more comprehendible, the system clock frequency is one fourth the high speed reference clock frequency and the frame sync frequency is one sixteenth the high speed reference clock frequency. However, the high speed reference clock and one or more system clocks can be any rational multiple of the frame sync. The system clock and frame synchronization signal are depicted with a notional positive timing skew 107 of one eighth the clock period (12.5%), as would be seen by a high speed D Flip Flop used as in a counter circuit in the master timing generator 42, so as to illustrate the ability of the embodiment to accommodate imperfect timing. It will be appreciated that the master system clock 101 and master frame synchronization signal 103 can be readily synthesized from the master high speed reference clock 100, e.g. by using counters, shift registers, etc. In this example, data 102 consisting of one or more bits wide are generated in the source unit 40 at the rate of the system clock 101. The data 102 is depicted as simultaneous 1's and 0's to indicate that the data can be any arbitrary state. A composite clock 104 (52 in FIG. 3) is generated by inverting the high speed reference clock phase by the logic state of the frame sync 103 using the embodiment in FIG. 4. The original high speed reference clock phase is shown in FIG. 6 as a dashed line 105 to illustrate the phase inversion resulting from the encoding method. A phase delay uncertainty interval 108 in the composite waveform 106 received at the destination (32/52) is depicted in FIG. 6 which results from the digital logic and output buffer delay variation of the clock encoding function and distribution function (43 in FIG. 3) in addition to cable media. A distortion of the composite waveform is shown as a result of the master timing skew 107 between the reference clock and the synchronization signal.

As can be seen in FIG. 6 the composite clock waveform 104 appears as a modulated carrier with symbol rate (based on data 102) equal to twice the frame synchronization frequency 103. The original frame synchronization baseband frequency (103) of one sixteenth of the reference clock frequency shows up as modulation sidebands in the composite clock frequency spectrum. The majority of the energy associated with the synchronization signal is therefore placed at a location much higher in frequency. Elimination of the frame synchronization baseband frequency component, which is significantly lower in frequency than the reference clock frequency, makes it practical to use a narrowband AC coupled RF amplifier to boost the magnitude of the composite clock signal and to use passive power splitters for distribution. Those skilled in the art will understand, in view of the information herein, that the required "low end cutoff" for the RF amplifier (the AC coupling frequency) for this composite signal, for the example 1000 to 1 ratio of reference clock compared to synchronization clock, is on the order of 20 times the synchronization signal frequency (200 MHz in the 10 MHz example). This is in contrast to approximately 50 times lower than the synchronization signal (200 KHz in the example) for a system that transmits a separate baseband synchronization signal, for a net reduction in required bandwidth of three decades. The improvement is even greater for larger ratios of reference clock to synchronization clock frequency.

Figure 7:
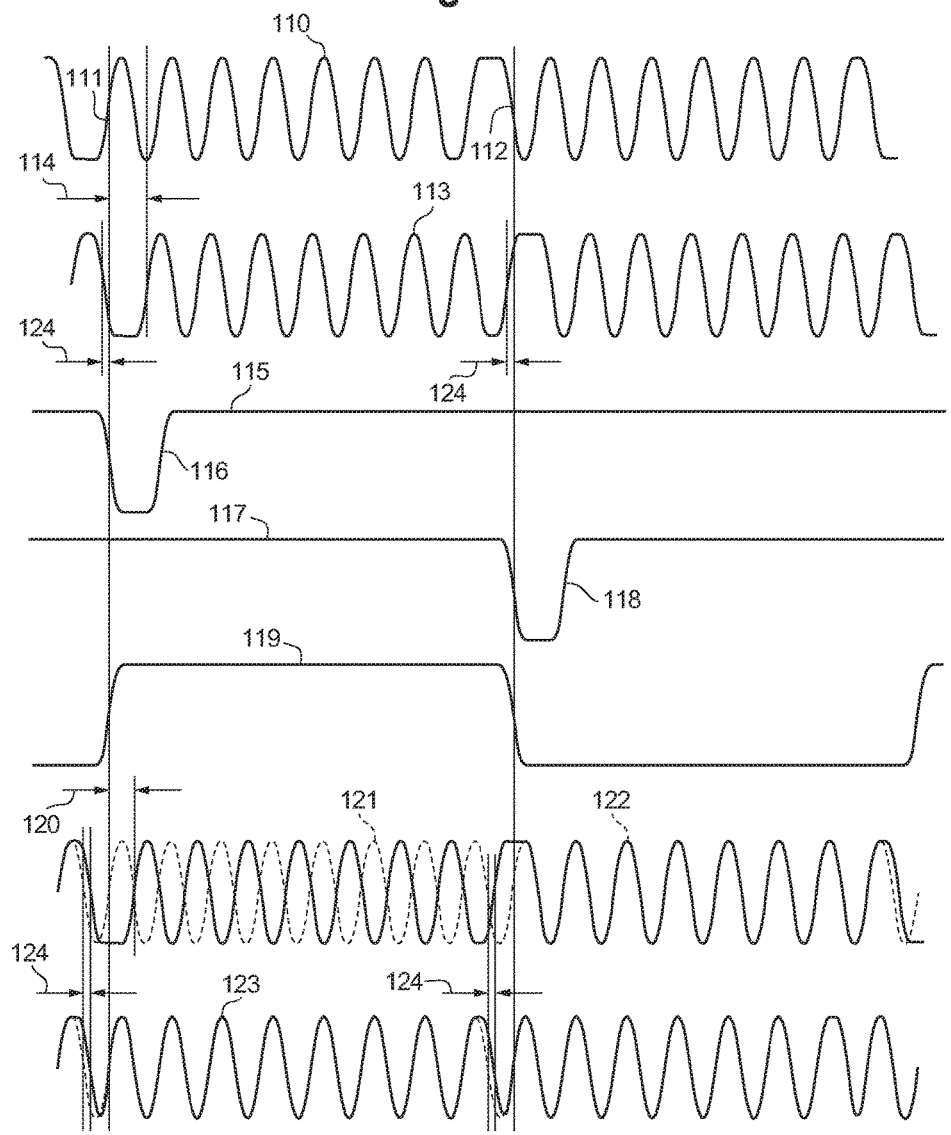
FIG. 7 is a timing diagram of waveforms associated with the clock and timing recovery components such as by the embodiment of FIG. 5 showing the reconstruction/derivation of a high speed clock reference signal and frame synchronization signal from the composite clock signal.

FIG. 7 is an illustration of the waveforms generated by the exemplary decoding circuit in FIG. 5 when the composite high speed clock 110 (104 in FIG. 6) is applied to its input 76 (52 in FIG. 3). The composite high speed clock 110 (76 in FIG. 5) is delayed by three quarters of a clock period 114 and appears as a delayed waveform 113 (77 in FIG. 5). A delay of three quarters of a clock period T is chosen in this embodiment to detect the one-half clock period phase inversion in the composite clock waveform due to encoding the synchronization signal. The additional one quarter clock period delay is provided to optimize setup time and hold time. The critical rising edge 111 of the composite high speed clock 110 re-clocks the delayed copy 113 and generates a low state 116 on sync pulse 115 (node 78 in FIG. 5). The exemplary 12.5% distortion of the waveform 124 (107 in FIG. 6) resulting from the timing skew between the reference clock and synchronization signal is included. This error is presumed to be small enough to meet setup and hold time as the delayed composite clock 113 is sampled by the received composite clock 110. Thus, this illustrates that the embodiment is able to operate satisfactorily even in view of the original timing skew. The critical falling edge 112 of the composite high speed clock 110 re-clocks an inverted version of delayed copy 113 and generates a low state 118 on the second sync pulse 117 (node 79 in FIG. 5). The composite waveform distortion 124 is likewise small enough to meet setup and hold time. A comparable 12.5% timing error on the composite waveform delayed ¾ of a clock period 113 will likewise meet setup and hold time such that the sensitivity of the embodiment of FIG. 5 is able to accommodate minor (i.e., 12.5%) uncertainty of the absolute delay (71 in FIG. 5). The sync pulses 115 and 117 generate the reconstructed synchronization signal 119 (node 80 in FIG. 5).

The reconstructed synchronization signal 119 is combined with a delayed copy 122 of the composite high speed clock 110 delayed one half of a clock period 120. The dashed line 121 depicts the original phase of the high speed reference clock prior to encoding. The exclusive-OR gate 75 results in the reconstructed high speed reference clock 123 with its correct phase relationship to the synchronization signal 119. The exemplary 12.5% timing error 124 (107 from FIG. 6) results in a duty cycle distortion in the reconstructed clock waveform 123. Only the falling edges are affected by this timing error 124. Any timing error between the composite clock delayed ½ a clock period 121 and the reconstructed synchronization signal 119 will result in distortion of the rising edge of the reconstructed high speed reference clock 123. Relative skew between the reconstructed synchronization signal 119 and reconstructed high speed reference clock will be equal to a gate delay (75 of FIG. 5) on the order of the notional 12.5% in this embodiment. This 12.5% timing skew is much lower than could be achieved where the high speed reference clock and synchronization signal are distributed over separate interfaces over a long distance. If the resulting distortion on the reconstructed high speed clock is not acceptable for the system, a delay locked loop can be used to generate a clean clock with low timing jitter (phase noise).

Figure 8:
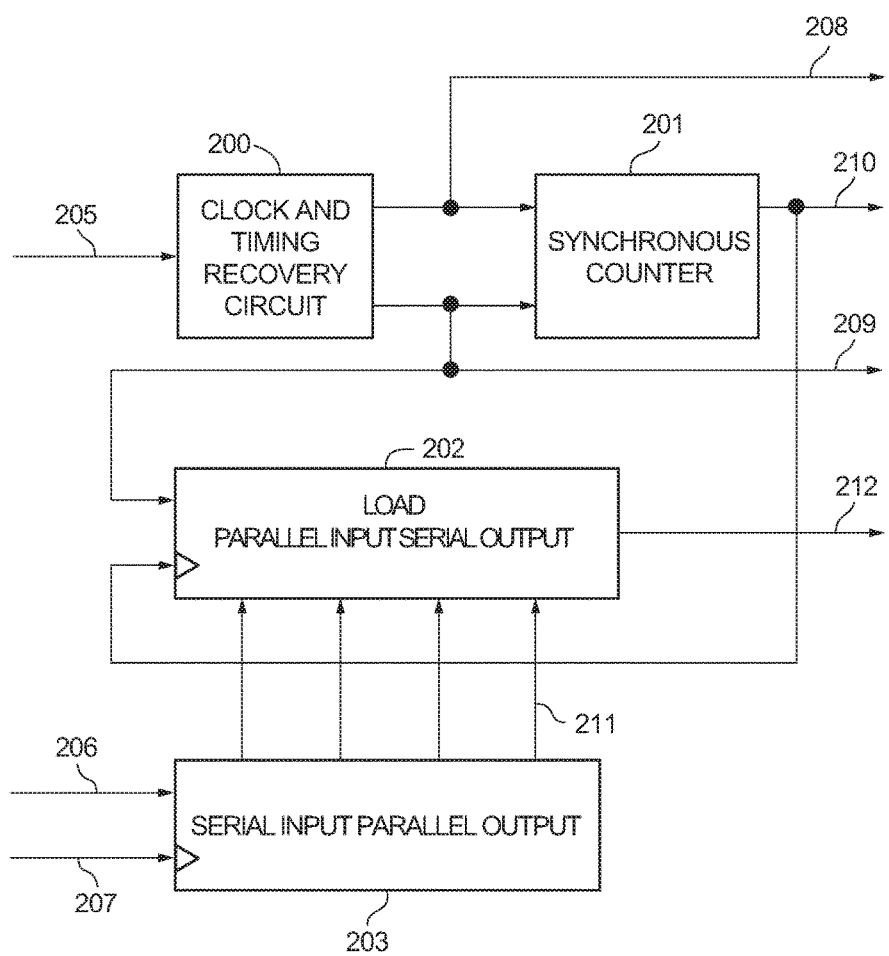
FIG. 8 is a schematic block diagram of an exemplary data synchronization component using the clock and timing recovery of FIGS. 5 and 7.

FIG. 8 is a schematic diagram of an exemplary embodiment of a data synchronization component (as in 26/46 associated with the system block diagrams in FIG. 2 and in FIG. 3). This embodiment couples the clock and timing recovery circuit 200 (45 in FIG. 3) with a synchronous counter 201, a serial input parallel output (SIPO) 203, and a parallel input serial output (PISO) 202. The composite clock 205 (32/52 of FIG. 2 and FIG. 3) is received along with system data 206 and clock 207 (33/53 of FIG. 2 and FIG. 3) and the example embodiment causes the system data 206 to be synchronized to the more accurate timing of the composite clock 205 and made available as data 212. For this exemplary embodiment the input system clock and data are shown as separate signals, however a parallel data interface or serial data stream using any serializer-deserializer (SER-DES) scheme may be used. Local copies of the high speed reference clock 208, frame synchronization signal 209, system clock 210 and system data 212 are generated with low (tens or hundreds of picoseconds, depending on technology used) timing skew and jitter.

The clock and timing recovery circuit 200 generates a reconstructed high speed reference clock 208 (34/54 in FIG. 2 and FIG. 3) and frame synchronization signal 209 (35/55 in FIG. 2 and FIG. 3) as described for FIG. 5 and FIG. 7. The synchronous counter 201, clocked by the high speed reference clock 208 and phase-synchronized to the frame synchronization signal 209, generates a system clock 210 at the same frequency as the received external system clock 207 but with its phase aligned to the frame synchronization signal 209. The external received system data 206 (33/53 in FIG. 2 and FIG. 3) is clocked into a SIPO 203 by the external received clock 207 (33/53 in FIG. 2 and FIG. 3). The SIPO data 211 is parallel-loaded into the PISO 202 by the frame synchronization signal 209 which in turn is clocked out by the internally generated system clock 210.

Figure 9:
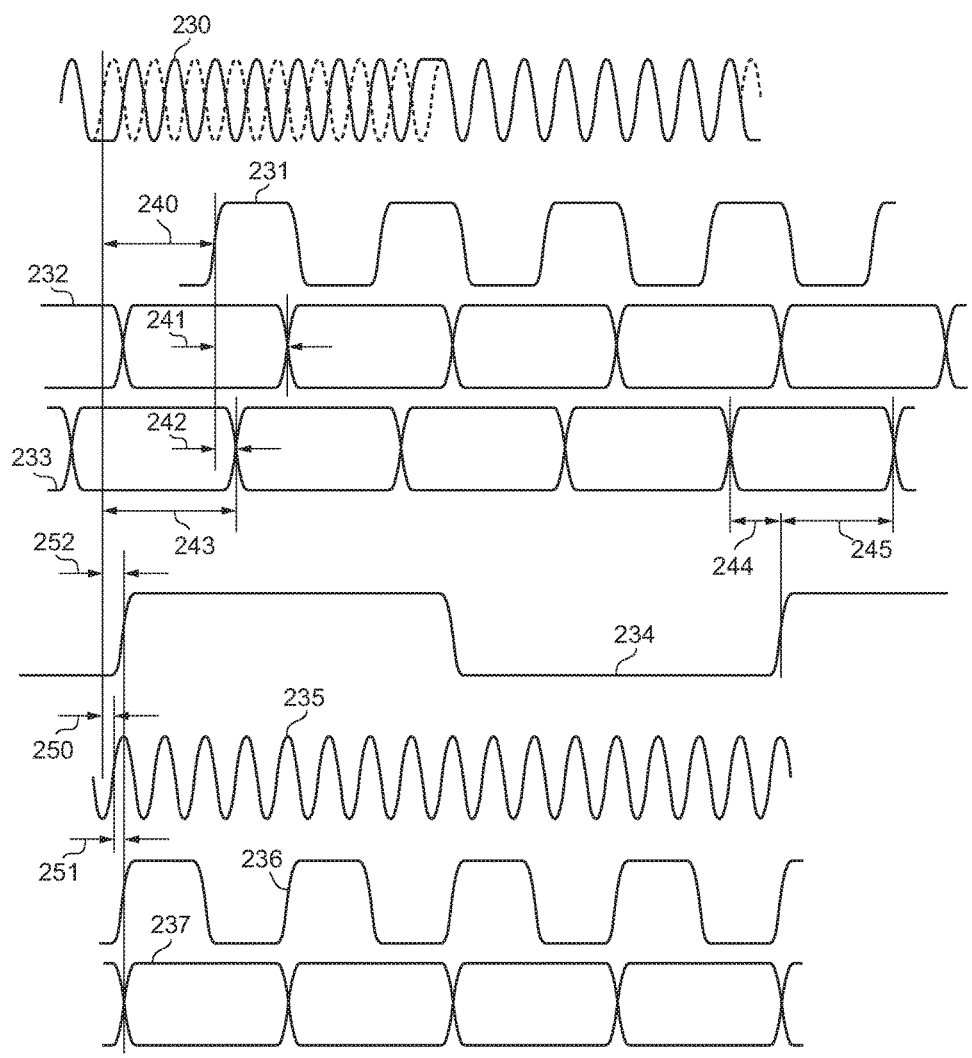
FIG. 9 is a timing diagram of waveforms associated with the data synchronization component showing the high speed reference clock, system clock, and frame sync clock.

FIG. 9 is an illustration of the waveforms in a destination unit 21 in FIG. 2 or in each of N destination units 41 with the encoding example in FIG. 4. The composite clock waveform 230 (52 in FIG. 3, 205 in FIG. 8) is received along with the system clock 231 and data 232 (53 in FIG. 3, 207/206 in FIG. 8) from the source unit 40 having accumulated an arbitrary timing skew 240 and 241, respectively, generated by the data source and distribution function 44 of FIG. 3. The destination unit 41 generates a reconstructed high speed reference clock 235 and frame sync 234 such as by using standard digital decoding logic with notional timing skews 250 and 251, respectively, resulting from the decoding logic gates. The total timing skew 252 from the received composite clock waveform 230 to the reconstructed frame synchronization signal 234 is the sum of timing skews 250 and 251. The data synchronization logic 46 in FIG. 3, depicted as the embodiment of FIG. 8, generates a local copy of the system clock 236 aligned with the local high speed reference clock 235 using a divide by four counter 201 in FIG. 8.

The received system clock 207 and data 206 of FIG. 8 are shown having relative timing skew 241 conducive to mid-bit clocking into the SIPO 203 in FIG. 8. The SIPO output 233 has an arbitrary propagation delay 242. Total timing skew 243 of the SIPO output 233 relative to the received composite clock 230 is the sum of timing skews 240 and 242. The frame synchronization rate in this exemplary embodiment is chosen as one quarter the system clock rate so as to allow synchronous parallel loading by the frame synchronization signal 234 with adequate setup time 244 and hold time 245. Judicious choice of the frame synchronization rate will permit a very wide total variation in SIPO output timing skew 233 typical of available fanout buffers, signaling devices and non-critical length cabling.

A benefit of this embodiment is that the system data is transferred from the received system clock domain 231 (207 in FIG. 8) to the reconstructed system clock domain 236 (210 in FIG. 8) where it is clocked out 237 (212 in FIG. 8) of the PISO 202 by the system clock 236 with a low skew 252 relative to the received composite clock 230.

FIG. 10 is an illustration of alternative composite high speed reference clock techniques. Choice of the preferred waveform is a tradeoff between the spectral content of the composite waveform and its corresponding transmission band edges, complexity of the encoding and decoding circuits, and the associated timing errors. A master high speed reference clock 300 and synchronization signal 301 may be combined using various encoding schemes. One alternate technique 302 encodes the synchronization signal by inverting the half clock pulse preceding and following the synchronization signals rising edge. Another technique 303 encodes the synchronization signal by skipping a clock cycle preceding and following the synchronization signals rising edge. In technique 304 only the clock cycle following the synchronization signal's rising edge is omitted. In technique 305 two cycles of the high speed clock straddle the synchronization signals rising edge with a half-rate clock for the remainder of the synchronization period. The phase of the original master high speed reference clock is indicated with a dashed line 306, 307, 308 and 309. The variations of embodiments of this invention have in common an alteration of the high speed clock to indicate the timing position of the embedded synchronization clock, where such alteration can be, but is not limited to, a shift in the time location of a high speed clock edge or edges from the normal location, or a removal of high speed clock edge or edges, or the inclusion of an additional high speed edge or edges, or an inversion of the high speed clock edges, or combinations of these alterations.

As will be understood by those skilled in the art based on the information provided herein, the operations of the generation of the clocks, embedding of the synchronization clock with the reference clock to create a composite signal, and recovery of the synchronization clock from the composite signal can be made to function with frequencies that are variable, rather than fixed, by using appropriate manual or automatic steps to adjust any compensating delays in the circuits to match the change in frequency. Application of embodiments of the invention may be made to any timing distribution system and is not restricted to a particular transmission medium or distance or frequency.

As will be well understood by those skilled in the art, the steps and processes discussed herein may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media. Instead of the illustrative discrete digital logic devices, corresponding functions integrated within an integrated circuit could be utilized. Further, software or firmware programmed to implement similar functions could also be used.

The foregoing discussion discloses and describes exemplary embodiments of the present invention. One skilled in the art will readily recognize from such discussion and from the accompanying drawings and claims that various changes, modifications and variations can be made therein without departing from the spirit and scope of the invention as defined in the following claims.

The invention claimed is:

1. A method for conveying a reference digital clock signal and a lower speed digital frame synchronization signal from an origination device to a remotely located device over a single transmission path comprising the steps of:
   generating, at the origination device, the reference digital clock signal having a repeating waveform at a first frequency;
   generating, at the origination device, the frame synchronization signal related by timing alignment to the reference digital clock signal and having a repeating waveform at a second frequency that is a rational fraction of the first frequency;
   generating, at the origination device, a composite signal by embedding regular alterations in the repeating waveform of the reference digital clock signal at intervals corresponding to the second frequency of the frame synchronization signal;
   receiving, at the remotely located device, the composite signal as propagated over the single transmission path;
   recovering, at the remotely located device, from the received composite signal a local reference digital clock signal and a local frame synchronization signal corresponding to the reference digital clock signal and the frame synchronization signal, respectively, wherein the relative timing between edges of the local reference digital clock signal and the local frame synchronization signal is substantially the same as the relative timing between edges of the reference digital clock signal and the frame synchronization signal.

2. The method of claim 1 further comprising transmitting the composite signal from the origination device to the remotely located device over the transmission path having a certain bandwidth that is sufficient to accommodate the required bandwidth of the composite digital clock signal, the certain bandwidth being less than a required bandwidth to transmit the frame synchronization signal itself, thereby permitting the conveyance of the digital frame synchronization clock information from the origination device to the remotely located device through the single transmission path with a substantially narrower bandwidth than would have been required to transmit the frame synchronization signal as an independent signal.

3. The method of claim 1 wherein the received composite signal includes a timing skew and wherein the local reference digital clock signal and the local frame synchronization signal are recovered at the remotely located device with a low timing skew.

4. The method of claim 1 wherein the second frequency is less than ⅛ times the first frequency.

5. The method of claim 1 wherein the regular alterations embedded in the repeating waveform of the reference digital clock signal comprises a phase shift of the reference digital clock signal at each rising and falling edge of the frame synchronization signal.

6. The method of claim 5 wherein the phase shift at each rising edge of the frame synchronization signal occurs relative to one of a positive and negative cycle peak of the reference digital clock signal and the phase shift at each falling edge of the frame synchronization signal occurs relative to the other of the positive and negative cycle peak of the reference digital clock signal.

7. The method of claim 1 wherein:
   the regular alterations are a phase shift of the reference digital clock signal;
   the recovering of the local reference digital clock signal and the local frame synchronization signal based on the processing of the received composite signal by a circuit of standard logic gates and at least one timing delay module having a first fixed time delay relative to one cycle period of the first frequency.

8. The method of claim 1 wherein:
   the regular alterations are a phase shift of the reference digital clock signal;
   recovering, at the remotely located device, from the received composite signal the local reference digital clock signal and the local frame synchronization signal based on the processing of the received composite signal by a circuit of standard logic gates, a first timing delay module having a first fixed time delay relative to one cycle period of the first frequency, and a second timing delay module having a second fixed time delay relative to the one cycle period of the first frequency, where the first and second fixed time delays are not equal, the difference between the first and second fixed time delays being related to the magnitude of the phase shift of the reference digital clock signal.

9. The method of claim 1 wherein the recovered local reference digital clock signal and local frame synchronization signal are automatically self aligned to each other without requiring external timing alignment.

10. A digital circuit for recovering clock information comprising:

standard digital logic circuitry receives a composite digital signal containing a reference digital clock signal having a repeating waveform at a first frequency, embedded in the reference digital clock signal is a frame synchronization signal having a repeating waveform at a second frequency that is rational fraction of the first frequency, the frame synchronization signal being embedded as a phase shift in the repeating waveform of the reference digital clock signal at intervals corresponding to the second frequency of the frame synchronization signal;

wherein the standard digital logic circuitry comprises first and second circuit modules and each of the first and second modules provides a time delay of the composite digital signal by fixed first and second amounts relative to one cycle period the first frequency, respectively, the first and second amounts being unequal, the difference in the first and second amounts being related to the amount of the phase shift;

the standard digital logic circuitry, based on the composite digital signal and time delayed signals of the composite digital signal, generates at one output a local reference digital clock signal being a replica of the reference digital clock signal and generates at another output a local frame synchronization signal being a replica of the frame synchronization signal;

wherein the relative timing between edges of the local reference digital clock signal and the local frame synchronization signal is substantially the same as the relative timing between edges of an original reference digital clock signal and an original the frame synchronization signal from which the composite digital signal was created.

11. The digital circuit of claim 10 further comprising:

a transmission line coupled to the input over which the composite digital signal is received;

the transmission line having a certain bandwidth that is sufficient to accommodate the required bandwidth of the composite digital signal, the certain bandwidth being less than a required bandwidth to receive a transmission of the frame synchronization signal itself, thereby permitting the conveyance of the frame synchronization information from an origination device through the transmission line with a substantially narrower bandwidth than would have been required to transmit the frame synchronization signal as an independent signal.

12. The digital circuit of claim 10 wherein the composite digital signal is received at the input of the standard digital logic circuitry with timing skew, the local reference digital clock signal and the local frame synchronization signal being generated with low timing skew.

13. The digital circuit of claim 10 wherein the second frequency is less than $\frac{1}{8}$ times the first frequency.

14. The digital circuit of claim 10 wherein the phase shift of the reference digital clock signal occurs at each rising and falling edge of the frame synchronization signal.

15. The digital circuit of claim 14 wherein the phase shift at each rising edge of the frame synchronization signal occurs relative to one of a positive and negative cycle peak of the reference digital clock signal and the phase shift at each falling edge of the frame synchronization signal occurs relative to the other of the positive and negative cycle peak of the reference digital clock signal.

16. The digital circuit of claim 10 wherein the local reference digital clock signal and local frame synchronization signal are automatically self aligned in timing to each other by the standard digital logic circuitry without requiring additional timing alignment circuitry.

* * * * *